M. J. Miller.
Gas Retort.
No. 16,651.    Patented Feb. 17, 1857.

Witnesses
G. W. Morris
Jno. H. Bailey

Inventor
M. J. Miller

UNITED STATES PATENT OFFICE.

MICHAEL J. MILLER, OF ST. LOUIS, MISSOURI.

GAS-RETORT.

Specification of Letters Patent No. 16,651, dated February 17, 1857.

*To all whom it may concern:*

Be it known that I, MICHAEL J. MILLER, of the city of St. Louis, in the State of Missouri, have invented a new and useful Improvement in Distilling Carbureted Hydrogen Gas for Illuminating Purposes; and I do hereby declare that the following is a full, clear, and exact description of the same, reference being had to the annexed drawing, making a part of this specification, in which—

Figure 1:
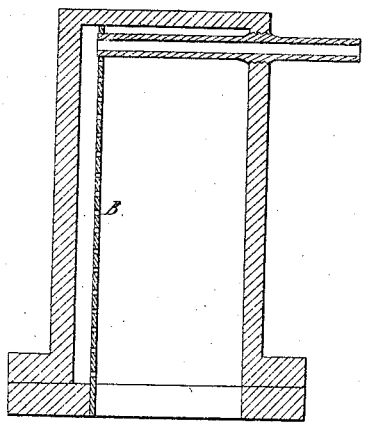
Figure 2:
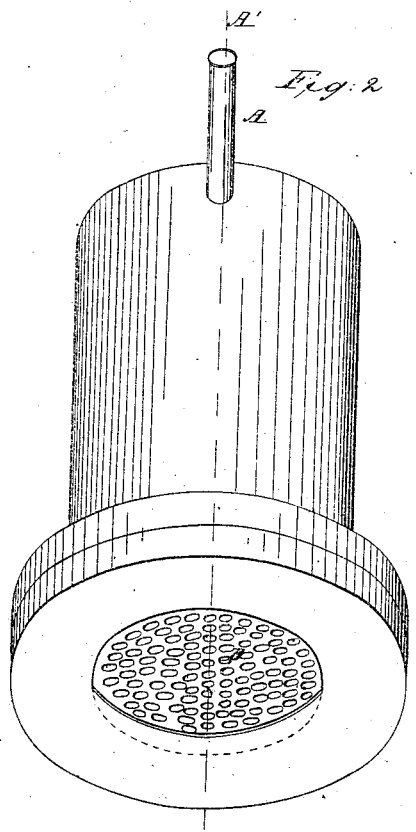

Figure 1 is a perspective of the retort—with the improvement—and Fig. 2 is a transverse section through A'.

The nature of my invention consists in providing means for a more perfect decomposition of the material—out of which carbureted hydrogen gas is made—or distilled.

It is the practice now in distilling gas, to place the educting pipe—leading from the retort to the condenser—on the top, of the retort, so that the gas after distillation, rises, enters the educting pipe, and is conveyed to the purifier, and from thence to the gasometer. But in the course of the above operation, large quantities of tar and ammoniacal vapor, held in solution by the gas, is carried over and deposited in the condenser. I find by experiment that this tarry substance may be greatly reduced, by a more perfect decomposition of the material, and the amount of gas, correspondingly increased, both in quantity and quality.

To effect this in practice is the object of my invention.

I insert the pipe A so as to reach to very near the bottom of the retort, as shown in the drawing. Now after the retort is charged, and heated to a sufficiently high temperature, the gas begins to evolve, and rises to the top of the retort, and would escape if the pipe was in the top, as is now the practice, but the pipes leading to the bottom, the gas first evolved must remain, and be subject to the action of the fire in the top of the retort, or return to the bottom and escape through the educting pipe; and in either case, a more perfect decomposition takes place, because the gas in returning must pass through the fire, and come in contact with the bottom of the retort, before it can escape in the educting pipe. My object in bringing the gas in contact with the bottom of the retort is because that part is always the hottest, which induces decomposition.

By the above operation, little or no tar is deposited, and the gas distilled gives a much brighter light as it partakes more of the nature of bi-carbureted hydrogen.

I apply my improvement either to a horizontal or a vertical retort.

B is a perforated plate placed in the bottom of the retort, upon which the material is distilled.

I claim—

The pipe A inserted, so as to receive the gas at the bottom of the retort as shown, on the drawings and as described in this instrument.

M. J. MILLER.

Witnesses:
 G. W. MORRIS,
 JNO. H. BAILEY.